(12) United States Patent
Englefield et al.

(10) Patent No.: US 6,580,823 B1
(45) Date of Patent: Jun. 17, 2003

(54) IMAGE MAPS

(75) Inventors: Paul Jonathan Englefield, Leamington Spa (GB); Mark Farmer, Birmingham (GB); Daniel Onions, Bingham (GB); Mark Justin Paul Tibbits, Leamington Spa (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/487,195

(22) Filed: Jan. 19, 2000

(30) Foreign Application Priority Data

Feb. 9, 1999 (GB) .............................. 9902734

(51) Int. Cl.[7] .............................. G06K 9/00
(52) U.S. Cl. .............. 382/162; 358/538; 345/593; 345/735
(58) Field of Search .............. 382/100, 162–167; 358/500–540; 345/581–606, 629–641, 708–740

(56) References Cited

U.S. PATENT DOCUMENTS 5,838,906 A * 11/1998 Doyle et al. ................ 345/738
5,864,337 A * 1/1999 Marvin ...................... 345/708
5,911,003 A * 6/1999 Sones ........................ 382/162
5,984,362 A * 11/1999 Chrisman ................... 283/34
6,307,573 B1 * 10/2001 Barros ....................... 345/764

FOREIGN PATENT DOCUMENTS

GB          2 319 445          5/1998

* cited by examiner

*Primary Examiner*—Jingge Wu
(74) *Attorney, Agent, or Firm*—Louis P. Herzberg

(57) ABSTRACT

An image map Java Bean or ActiveX control has a display image property and a mapping image property. The mapping image comprises a plurality of regions colored from a pre-determined sequence of colors. When instantiated the image map displays the display image. The image map is, responsive to user interaction with the display image, to obtain a coordinate in the display image and to reading an index color of a corresponding coordinate in the mapping image. If the index color is from the pre-determined sequence of colors, the image map indicates user selection of a region of the display image by highlighting the region.

16 Claims, 4 Drawing Sheets

IMAGE MAPS

FIELD OF THE INVENTION

The present invention relates to an image map component and a method of determining user selection from an image.

BACKGROUND OF THE INVENTION

As Internet connectivity rates increase, web pages can include more information, and as the number of users of the Internet diversifies to include less experienced computer users, web pages are becoming more and more interactive as user expectations for web page user friendliness are raised. Users no longer wish to use menus, scroll bars or to type options when a more intuitive alternative may be available.

For this reason, web page designers are turning to images to represent a set of options from which a user may choose. For example, a company producing a range of products, for example, household accessories, may wish to include an image showing each accessory in the range rather than having a user select from a menu of products or click on a product number. The company wants a user, on seeing their required choice in an image, simply to click on the required accessory and be brought to the relevant page.

An image map is a mechanism that enables a user to select one of several semantically distinct regions in a picture.

The best known implementation of an image map is provided as an HTML construct. To use an HTML image map, a content author uses an <IMG> tag to define an image and specifies the USEMAP attribute to identify the image as a client-side image map. A series of <MAP> and <AREA> tags are then coded to define a series of geometrical shapes that define the regions within the image. The supported geometrical shapes are circles, rectangles, and polygons. HTML also provides equivalent support for server side image maps.

Some utilities do exist to allow an author to specify the geometrical shapes visually. However, these are still difficult and time-consuming to use for mapping complex, irregular regions.

Other examples of image maps, are tessellated rectangular images driven by JavaScript.

In any case, the definition of regions using geometrical primitives does not adequately support mapping of images with the following characteristics:
I. regions with complex, irregular shapes;
II. discontiguous regions belonging to the same semantic region; and
III. where highly accurate mapping is required to support exact visual feedback such as: rollover emphasis (a region is accurately highlighted to show mouse proximity) or selection emphasis (a region is accurately highlighted to show selection status)

Characteristics I and II are typical of complex images such as maps, images, or creative artwork. The lack of support for such images may place restrictions on the choice of image and the creativity of visual designers. Criterion III is related to usability. It is clear that, as well as a pleasing display, good visual feedback is a key factor in the usability of applications.

A technique that overcomes some of these prior art problems in providing "hot-spots" in an image is PanoramIX from IBM which varies the red component of each pixel in a mapping image and uses an external lookup table to translate that red component to a unique link. See http://blackburn.watson.ibm.com/panoramix/example.html and related pages for further information.

DISCLOSURE OF THE INVENTION

The present invention on the other hand provides an image map component an image map component comprising: means for reading a display image and for causing said display image to be displayed; means for reading a mapping image comprising a plurality of regions coloured from a pre-determined sequence of colours; means, responsive to user interaction with said display image, for obtaining a coordinate in said display image and for reading an index colour of a corresponding coordinate in said mapping image; means, responsive to said index colour being from said pre-determined sequence of colours, for indicating user selection of a region of said display image.

The present invention provides a general purpose component solution to be adapted to solve a range of different business problems by collaborating with other components. It supports both selection in other components in response to user interactions and selection within itself in response to calls from other components. The Panoramix technique is implemented within a specialized, dedicated application intended to navigate panoramas. It is not a Java Bean, ActiveX control, or component and does not appear to interact with external components.

The invention exploits accurate region definition to support precise, visually attractive highlighting. The Panoramix technique appears to use the mapping image simply to correlate mouse clicks to identify hot spots.

The invention emphasises the use of a predetermined sequences of colors to support a natural and direct definition process. The Panoramix technique does not use a predetermined sequence of colors. Disadvantages of the PanoramIX method include less visual discrimination between mapping colors for large numbers of regions, and the additional effort, cognitive load, and potential for errors introduced by the additional step of manually editing a lookup table using a proprietary syntax.

It also appears that cutaway emphasis and pluggable emphasis techniques are not addressed by the Panoramix technique.

BRIEF DESCRIPTION OF THE DRAWINGS

Embodiments of the invention will now be described with reference to the accompanying drawings, in which.

DESCRIPTION OF THE PREFERRED EMBODIMENTS

The present invention provides an image map component implementing a mapping technique that does not rely on describing regions in terms of geometrical shapes. It supports highly accurate mapping through a direct, natural user interface.

The invention is preferably implemented as a Java Bean, although it will be seen that the invention is equally applicable to Microsoft's ActiveX technology or any other application building technology, in which self contained components can be assembled together with other components to create application solutions.

Figure 1:
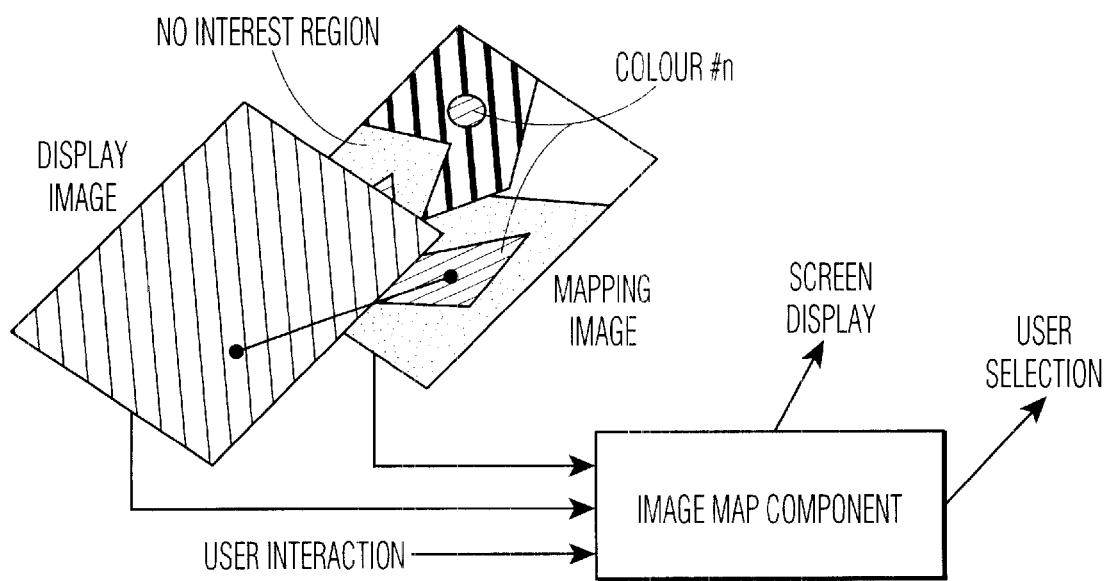
FIG. 1 is a schematic diagram.illustrating the operation of an image map component according to the invention.

Referring to FIG. 1, the invention essentially involves passing a display image and a mapping image or a reference thereto to the image map component. In describing the preferred embodiment, an image map component is used to display a map of Europe, FIG. 2, and to enable a user to select a country from that map in order to, for example, display a list of wines.

The display image contains the artwork to be displayed to the user. This image is typically acquired or created by a graphic designer. It should be noted that this image contains no semantic information that can be used by the image map component.

The mapping image is a version of the display image in which regions of interest are filled with a color selected from a pre-determined sequenced set of index colors. The regions do not have to be contiguous as in the case of the regions coloured with the index colour#n in FIG. 1.

Figure 2:
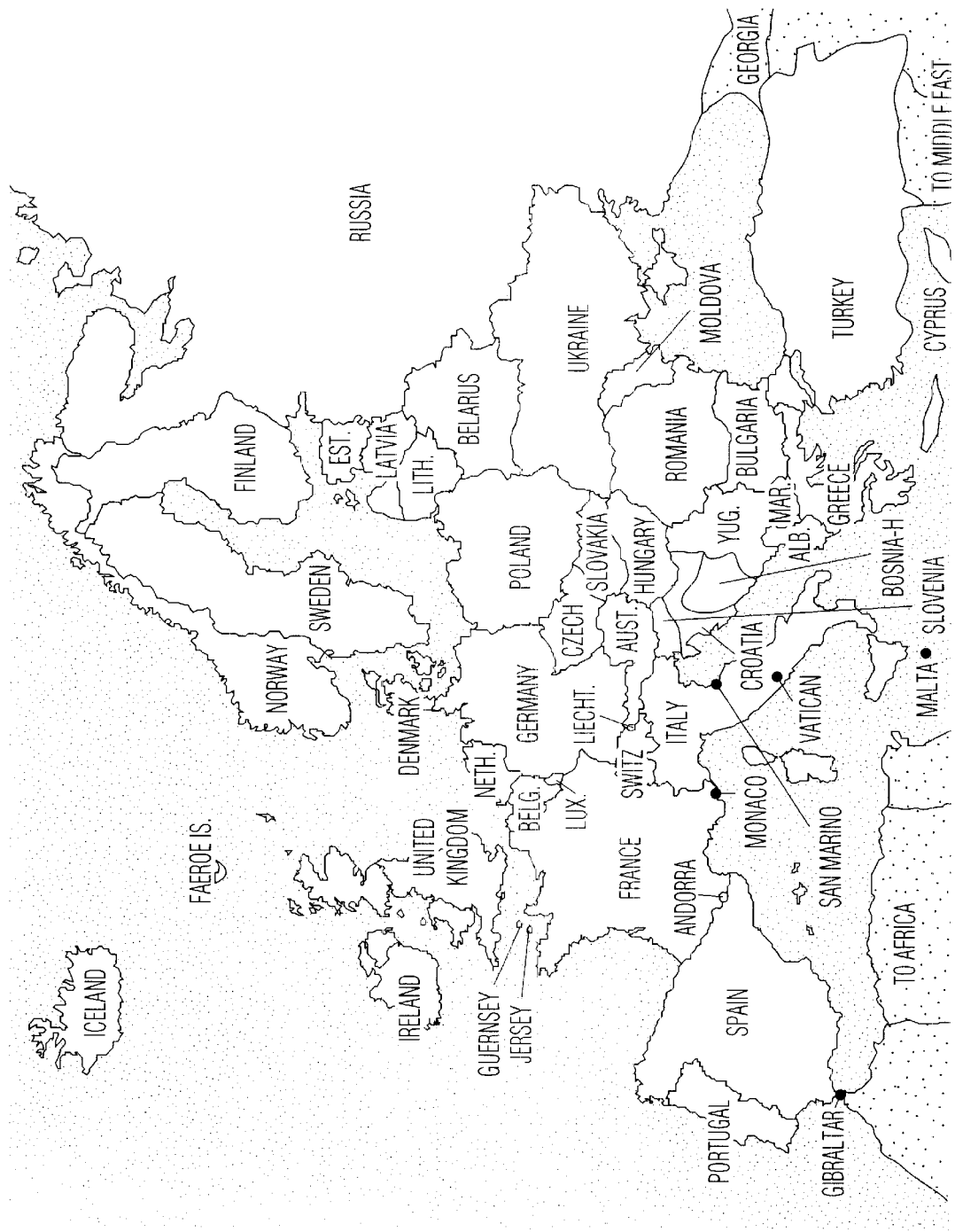
FIG. 2 is an example of a display image for the image map component of FIG. 1.
Figure 3:
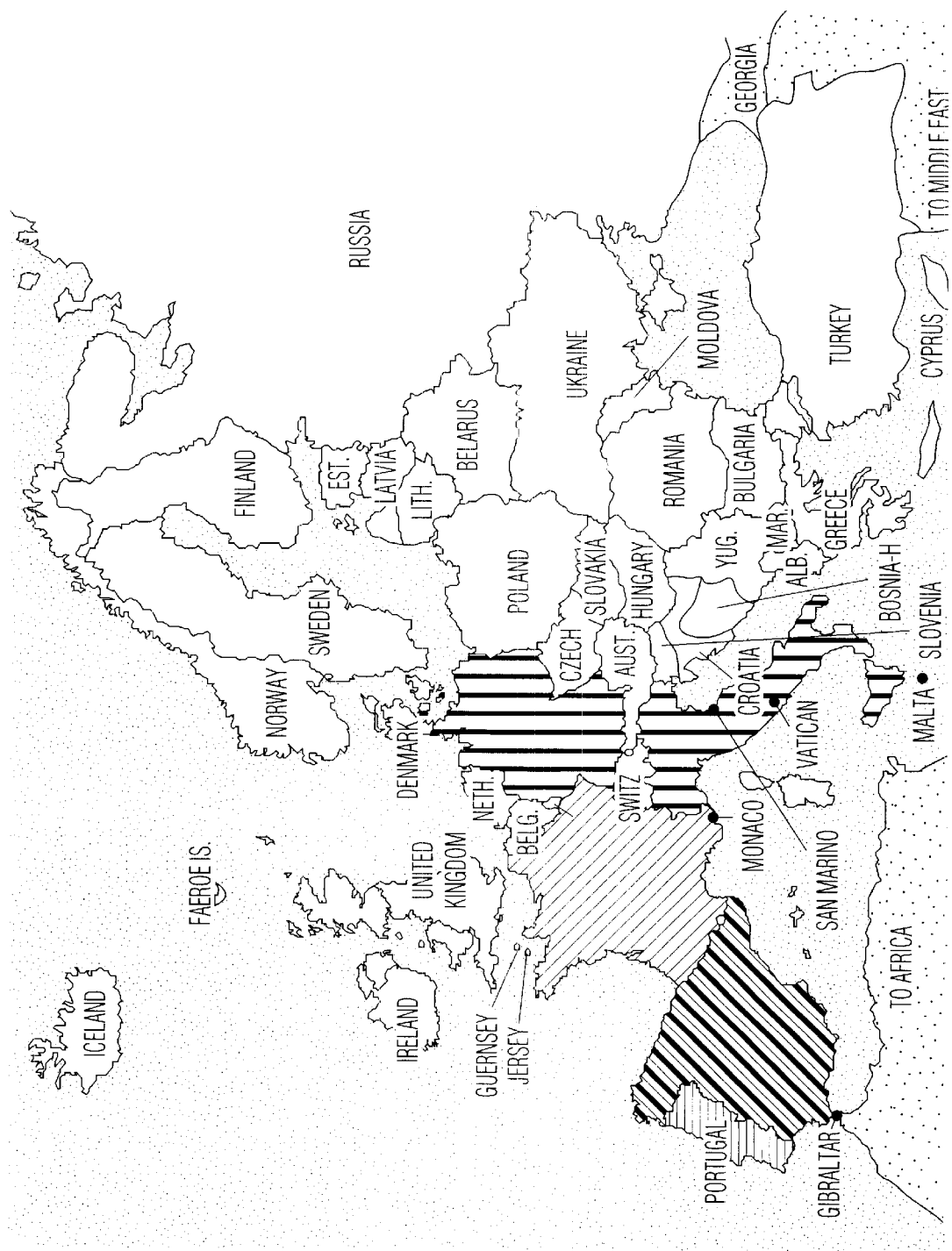
FIG. 3 is a corresponding mapping image including a color sequence for the display image of FIG. 2.

In the example of FIG. 3 which is the mapping image corresponding to the display image of FIG. 2, the sequenced set of predetermined index colors begins with, for example, Magenta=0 to Yellow=4. This image is typically created by a graphic designer by copying and adapting the display image using a graphics software application, for example, Adobe Photoshop.

Graphics applications support the task of creating the mapping image through design-time tools to support the detection and enhancement of images and smart flood-fill of bounded areas. The colors applied to regions of the mapping image are used to define the corresponding regions of the display image. The sequence of each of the applied colors within the set of colors also implies a sequence number for the region defined by that color.

It should be noted at this stage that the mapping image is never seen by the user and so need not relate directly to the display image as in the case of FIGS. 2 and 3. It should also be seen that the designer does not need to alter regions in the mapping image corresponding to regions of the display image which are of no interest, as in the case of Russia or Finland in FIG. 3. This may cause the image map component to return less than intuitively correct values if the user clicks on pixels from such regions which happen to be from the pre-determined sequence of colours, but nonetheless makes the generation of the mapping image quicker.

Alternatively, a colour from the sequence may be associated with regions of no interest so that the image map component can suppress event generation from such regions.

Figure 4A:
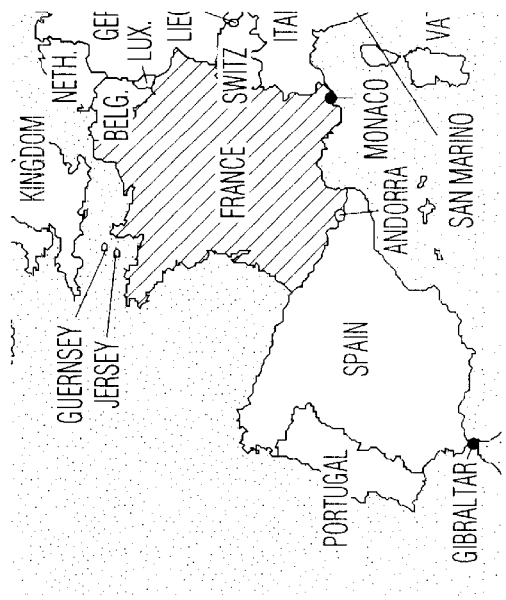
FIGS. 4(a) and 4(b) are examples of portions of the display image in use showing the representations of regions modified by selection and rollover emphases.
Figure 4B:
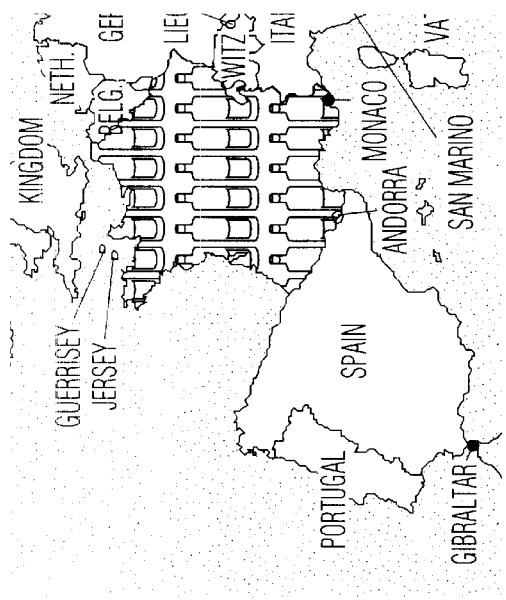

The operation of the invention is first explained broadly according to the user's view.
1. When the application is a web page, the HTML page is downloaded to a client web browser and an applet including an instance of the image map component is instantiated. (It should be seen that the component may be part of a stand-alone application not necessarily used in a web context.) The instance of the image map component causes the display image to be displayed, FIG. 2, in an area of the screen defined by the <APPLET> tags parameters.
2. FIG. 4(a) shows, in detail, the display image as the user moves the mouse over Portugal. The entire region for Portugal is highlighted in a lighter color to show a rollover emphasis.
3. FIG. 4(b) shows, in detail, the display image when the user clicks on France. The entire region for France is highlighted in a darker color to show a selection emphasis.
4. Usually, one or more components of the application (not shown) will be listening for the generation of an event indicating that the user has made a selection.

Preferably, such listener components are prompted by the image map component, and they interrogate the properties of the image map component to determine the user selection. In the present example, these listener components might use the property value to display a list of wines for sale, in this case French wines or perhaps to display a photograph of the region or even to jump to a further web page specific to the region.

In more detail:
1. The application including the image map component starts and the image map component causes the display image to be shown.
2. When a user moves the mouse pointer into the image map screen display, the map component gains focus and begins to respond to mouse events:
   2.1 Whenever the mouse moves, the image map component determines the coordinates of the mouse within the display image, say point x in FIG. 1.
   2.2 The image map component then retrieves a mapping color, by examining the color of the pixel x at the corresponding coordinates in the mapping image. In the case of FIG. 1 this will return the colour#n, in the case of FIG. 4(a) the colour will be yellow.
   2.3 If the mapping color matches any of the colors within the set of predetermined index colors . . .
   2.4 . . . the mouse is considered to be within a region of interest, in this case Portugal. The extent of the region is all pixels of the display image where the corresponding pixel of the mapping image is set to that mapping color.
   2.5 . . . the sequence number of that region is derived from the sequence of the mapping color within the sequenced set of predetermined index colors.
   2.6 . . . optionally, a visual effect is applied to emphasize all pixels in the display image for which the corresponding color in the mapping image is the same as the color in mapping image under the mouse. Thus, Portugal is displayed lighter.
3. When user clicks the mouse within the image map:
   3.1 The image map component determines coordinates of mouse within display image.
   3.2 The image map component retrieves a mapping color by examining the color of the pixel at the corresponding coordinates in the mapping image.
   3.3 If the mapping color matches any of the colors within the set of predetermined index colors . . .
   3.4 . . . the mouse is considered to be within a region, in the case of FIG. 4(b) this is France.
   3.5 . . . the sequence number of that region is derived from the sequence of the mapping color within the sequenced set of predetermined index colors.
   3.6 . . . preferably, other listener components are notified that the user has selected the region with that sequence number. In this case, a notified listener could display a list of wines from France.

3.7 ... preferably, a visual effect is applied to emphasize all pixels in the display image for which the corresponding color in the mapping image is the same as the color in the mapping image under the mouse. (France is displayed darker).

Steps 2.7 and 3.7 above enable the image map component to support a variety of highlighting techniques to show rollover and selection emphasis. These techniques programmatically inspect and modify each pixel in a region of the display image. For example, as described above, on rollover or selection, the image map can modify the display image to show a region lighter or darker, or with modified or inverted colors.

It also enables an additional emphasis technique known as trap-door or cutaway emphasis.

Figure 5A:
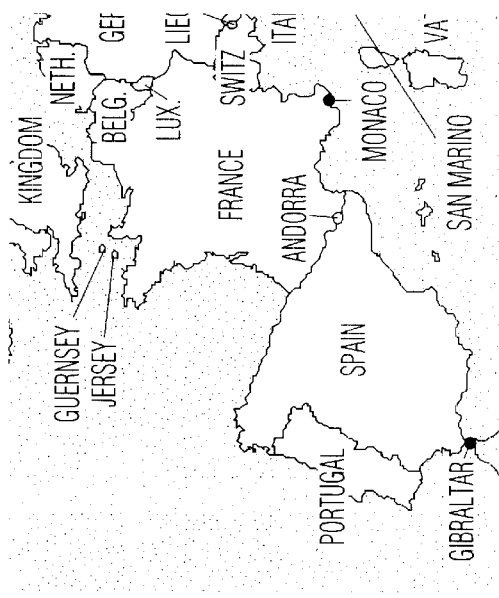
FIG. 5(a) shows a cutaway pattern image.

In an alternative embodiment, trap-door emphasis uses an additional emphasis image, FIG. 5(a), to define an arbitrary emphasis designed by a graphic designer. The image map displays the emphasis image underneath the display image. Because the display image is usually opaque, the emphasis image is not normally seen by the user.

Figure 5B:
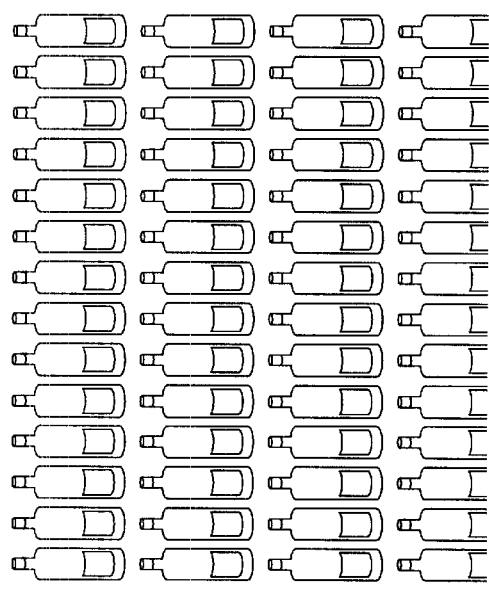
FIG. 5(b) shows an alternative embodiment of the invention in operation with the cutaway pattern image of FIG. 5(a).

To emphasise the display in response to rollover or selection in a region, that region in the display image is made transparent or partially transparent to allow the emphasis image to be revealed in that region only. FIG. 5(b), shows the selection emphasis for France applied using trap-door emphasis.

The interface to a Java bean image map component implementing the invention is described below in terms of its properties, events and methods.

Properties displayImage A string containing the file name of the image to be displayed by the component.

colorMapImage A string containing the file name of the image that defines the discrete regions of the display image by filling those regions with predefined colors. This image is not displayed by the component.

cutawayImage A string containing the file name of the image to be used for cutaway emphasis. Only required if cutaway emphasis is used.

rolloverEmphasisStyle An integer defining a style of emphasis to be applied to a region when user moves the mouse over that region. The integer value identifies one of a set of predefined emphasis styles such as darken, lighten, negative, or cutaway.

selectionEmphasisStyle Another integer defining a style of emphasis to be applied to a region when the user selects a point within that region. The integer value identifies one of a set of predefined emphasis styles such as darken, lighten, negative, or cutaway.

selectedRegion An integer containing the Index of selected region. It is this value that is used by listener components.

tooltips An array of strings to be displayed as tooltips for each respective region when the user leaves the mouse over a point within that region for more than a pre-determined time.

Methods

ImagePicker A constructor which causes the display image to be displayed.

add/remove ItemListener Methods called by another component to register or unregister that component as a listener.

get/set DisplayImage Methods for returning or setting displayImage.

get/set ColorMapImage Methods for returning or setting colorMapImage.

get/set CutawayImage Methods for returning or setting cutawayImage.

get/set SelectionEmphasisStyle Methods for returning or setting selectionEmphasisStyle.

get/set RolloverEmphasisStyle Methods for returning and setting rolloverEmphasisStyle.

get/set Tooltips Methods for returning and setting toolTips.

get/set SelectedRegion Methods for returning or setting selectedRegion. getSelectedRegion is primarily used by listener components to determine the selection once they have been notified of an ItemEvent. setSelectedRegion could be used by the constructor class to set a default region, perhaps to show to a use that the display image is interactive. It could also be used by other components to set a selected region. For example, a user may pick a name of a wine from a first list box component, this could be checked by another component to determine the country of origin of the wine which in turn sets the selected region accordingly, to cause the country to be highlighted.

Events

ItemEvent Notifies another registered listener component that a region has been selected or deselected.

It should be seen that while the preferred embodiments have been described with reference to a mouse, the invention is applicable to any pointing device.

What is claimed is:

1. An image map component comprising:

means for reading a display image and for causing said display image to be displayed;

means for reading a mapping image comprising a plurality of regions coloured from a pre-determined sequence of colurs;

means, responsive to user interaction with said display image, for obtaining a coordinate in said display image and for reading an index colour of a corresponding coordinate in said mapping image;

means, responsive to said index colour being from said pre-determined sequence of colours, for indicating user selection of a region of said display image.

2. An image map component as claimed in claim 1 wherein said component is responsive to mouse pointer interaction with said display image.

3. An image map component as claimed in claim 2 in which user interaction comprises clicking a mouse button and said indicating means is adapted to highlight in a first manner any pixel in said display image whose corresponding pixel in said mapping image is the same colour as said index colour.

4. An image map component as claimed in claim 3 in which user interaction comprises locating said mouse pointer over said display image and said indicating means is adapted to highlight in a second manner any pixel in said display image whose corresponding pixel in said mapping image is the same colour as said index colour.

5. An image map component as claimed in claim 1 comprising means for reading an emphasis image and said indicating means is adapted to colour any pixel in said display image, whose corresponding pixel in said mapping image is the same colour as said index colour, in the colour of a corresponding pixel in said emphasis image.

6. An image map component as claimed in claim 3 wherein said component includes a characteristic indicative of said selected region of said display image and said indicating means is adapted to update said characteristic in response to said mouse click.

7. An image map component as claimed in claim 6 in which said component includes means for allowing any other component to be added or removed as a listener to said image map component; means for allowing any other component to get the value of said characteristic and wherein said indicating means is adapted to notify any listeners of a change in said characteristic.

8. An image map component as claimed in claim 7 in which said component is one of a Java Bean or an ActiveX control.

9. An image map component as claimed in claim 1 wherein said indicating means is responsive to a region corresponding to an index colour being selected by another component to highlight any pixel in said display image whose corresponding pixel in said mapping image is the same colour as said index colour.

10. A method of obtaining user selection from a displayed image comprising the steps of:

responsive to user interaction with said displayed image, obtaining a coordinate in said displayed image and reading an index colour of a corresponding coordinate in a mapping image comprising a plurality of regions coloured from a pre-determined sequence of colours;

responsive to said index colour being from said pre-determined sequence of colours, indicating user selection of a region of said display image.

11. An article of manufacture comprising a computer usable medium having computer readable program code means embodied therein for obtaining user selection from a displayed image, the computer readable program code means in said article of manufacture comprising computer readable program code means for causing a computer to effect:

obtaining a co-ordinate in said displayed image and reading an index colour of a corresponding co-ordinate in a mapping image comprising a plurality of regions coloured from a predetermined sequence of colours;

responsive to user interaction with said displayed image, indicating user selection of a region of said display image, responsive to said index colour being from said predetermined sequence of colours.

12. A program storage device readable by machine, tangibly embodying a program of instructions executable by the machine to perform method steps for obtaining user selection from a displayed image comprising the steps of:

responsive to user interaction with said displayed image, obtaining a co-ordinate in said displayed image and reading an index colour of a corresponding co-ordinate in a mapping image comprising a plurality of regions coloured from a predetermined sequence of colours;

responsive to said index colour being from said predetermined sequence of colours, indicating user selection of a region of said display image.

13. A computer program product comprising a computer usable medium having computer readable program code means embodied therein for causing acquisition of user selection from a displayed image comprising the steps of:

responsive to user interaction with said displayed image, obtaining a co-ordinate in said displayed image and reading an index colour of a corresponding co-ordinate in a mapping image comprising a plurality of regions coloured from a predetermined sequence of colours;

responsive to said index colour being from said predetermined sequence of colours, indicating user selection of a region of said display image.

14. An article of manufacture comprising a computer usable medium having computer readable program code means embodied therein allowing an image map component to respond to mouse pointer interaction with a display image, the computer readable program code means in said article of manufacture comprising computer readable program code means for causing a computer to effect:

reading a display image and for causing said display image to be displayed;

reading a mapping image comprising a plurality of regions coloured from a pre-determined sequence of colours;

obtaining a co-ordinate in said display image and for reading an index colour of a corresponding co-ordinate in said mapping image, responsive to user interaction with said display image; and responding to said index colour being from said pre-determined sequence of colours, for indicating user selection of a region of said display image.

15. A program storage device readable by machine, tangibly embodying a program of instructions executable by the machine to perform method steps for allowing an image map component to respond to mouse pointer interaction with a display image, comprising the steps of:

reading a display image and for causing said display image to be displayed;

reading a mapping image comprising a plurality of regions coloured from a pre-determined sequence of colours;

obtaining a co-ordinate in said display image and for reading an index colour of a corresponding co-ordinate in said mapping image, responsive to user interaction with said display image; and responding to said index colour being from said pre-determined sequence of colours, for indicating user selection of a region of said display image.

16. A computer program product comprising a computer usable medium having computer readable program code means embodied therein for causing an image map component to respond to mouse pointer interaction with a display image comprising the steps of:

reading a display image and for causing said display image to be displayed;

reading a mapping image comprising a plurality of regions coloured from a pre-determined sequence of colours;

obtaining a co-ordinate in said display image and for reading an index colour of a corresponding co-ordinate in said mapping image, responsive to user interaction with said display image; and responding to said index colour being from said pre-determined sequence of colours, for indicating user selection of a region of said display image.

* * * * *